United States Patent [19]

Cheek

[11] 4,231,467
[45] Nov. 4, 1980

[54] DRY STACKER AND RECLAIMER

[75] Inventor: Edward E. Cheek, Brunswick, Ohio

[73] Assignee: Dravo Corporation, Pittsburgh, Pa.

[21] Appl. No.: 42,126

[22] Filed: May 24, 1979

[51] Int. Cl.³ .................... B65G 65/00; B65G 65/02
[52] U.S. Cl. .................................... 198/508; 198/519
[58] Field of Search ............... 198/508, 519, 525, 511

[56] References Cited

U.S. PATENT DOCUMENTS 3,756,369  9/1973  Hulett et al. ..................... 198/511

FOREIGN PATENT DOCUMENTS 2756312  6/1979  Fed. Rep. of Germany .

Primary Examiner—Robert B. Reeves
Assistant Examiner—Brian Bond
Attorney, Agent, or Firm—Pearne, Gordon, Sessions, McCoy & Granger

[57] ABSTRACT

There is disclosed a backstacker-reclaimer apparatus which includes a frame having a combined stacking and reclaiming boom. A plurality of spaced stacking and reclaiming flights are longitudinally driven about the boom by an endless chain drive. A conveyor is provided which feeds material to be stacked to the lower reach of the boom so that flights traveling along the lower reach may push the material up onto the stack. The material is confined in the lower reach by side skirts which may be raised for a reclaiming operation.

4 Claims, 2 Drawing Figures

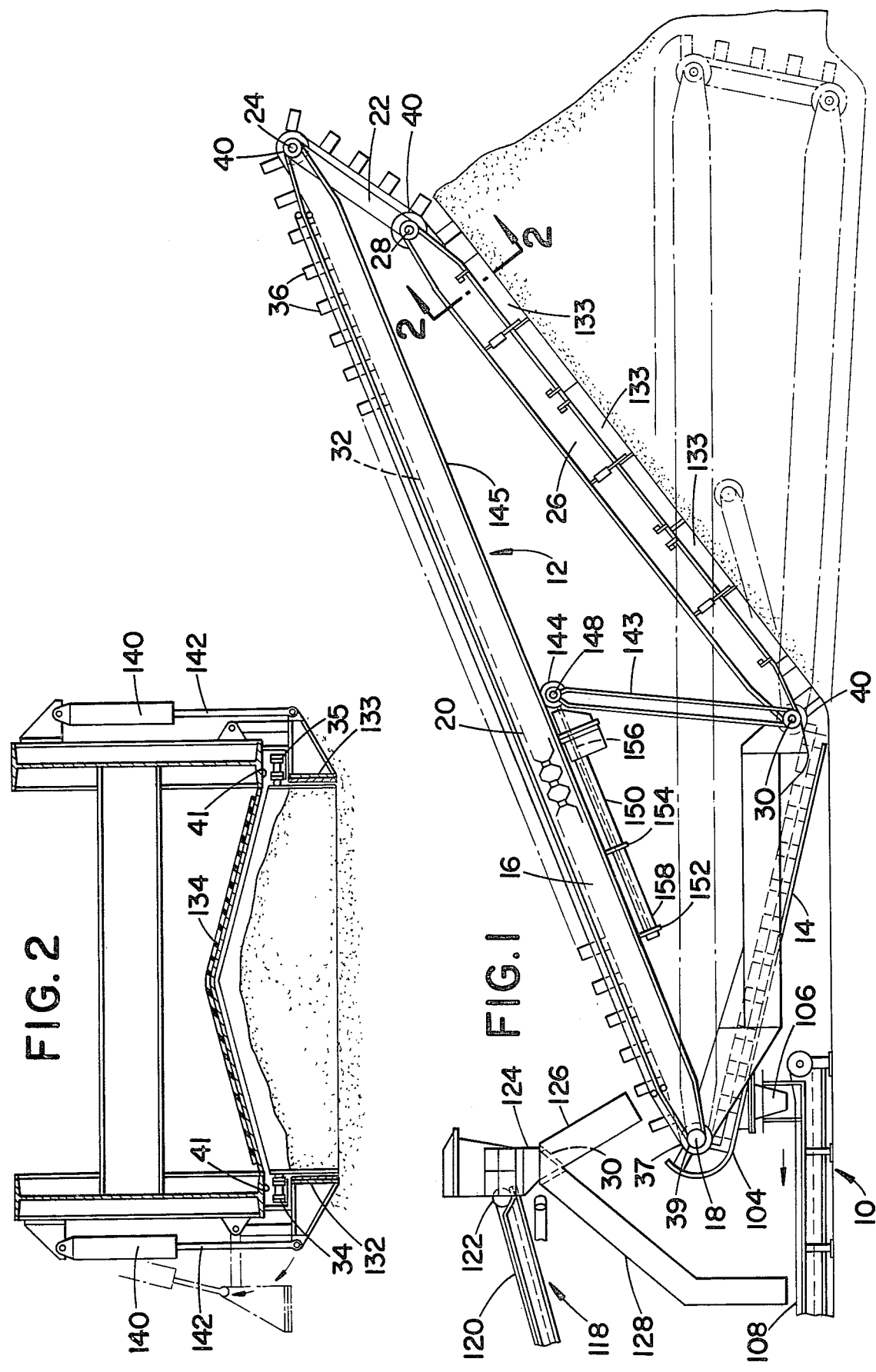

DRY STACKER AND RECLAIMER

BACKGROUND OF THE INVENTION

In the handling of bulk materials, such as coal, ore, sand, gravel, grain, phosphates, and the like, large quantities of such materials are conveniently and temporarily stacked in piles with the aid of a traveling conveyor belt or series of conveyor belts. These conveyor belts accept the bulk material from transport vessels, such as railroad cars or ships, and deposit the material in such piles. In order to recover the material from temporary storage thereof, it has been customary to utilize a second piece of apparatus called a reclaimer, which traverses the length of the pile of stacked material and, by means of an endless chain of raking flights, drags the material down the side of the pile and into the mouth of a hopper which, in turn, deposits the material on a conveyor belt for distribution to awaiting transportation means, e.g., ships or railroad car, or to a plant where the material is ultimatley utilized.

Stacking and reclaiming functions have been combined in a single apparatus, as is shown in U.S. Pat. No. 3,618,744. According to that patent, there is disclosed a stacker-reclaimer apparatus utilizing an endless conveyor belt in conjunction with an endless chain system supporting raking flights mounted on a single boom. Dry material to be stacked is fed into pockets formed by the upper reach of flights in the belt and the material is conveyed to the pile being formed. The material is reclaimed by engaging the lower reach of raking flights on the side of the pile.

It has been found that problems exist when certain materials are stacked in a pile. Fine materials, such as phosphates, tend to blow and scatter as they are dropped from the distal end of the boom to the pile, particularly on windy days. This not only results in a loss of material, but also contributes pollutants to the atmosphere.

To overcome this problem, a stacker-reclaimer has been developed wherein the endless belt is omitted and, for a stacking operation, the direction of flight movement is reversed so that the material is fed to the proximal end of the stacker and is pushed onto the pile by the flights, rather than being dropped. Such an apparatus is set forth in Polish Pat. No. 46,890. The advantage of this method of stacking (commonly known as backstacking) are many, among which are the elimination of the conveyor belt, less pollution from dust, and better bedding for blending. The disadvantage of all rakes is that when they are used for backstacking their capacity is limited to or less than the reclaimed capacity. This is because the friction of the material being moved on the piled material, gravity and vibration cause the material to pile back against the flight, which, together with the travel motion of the machine, also causes the material to be lost from the flight, trailing out as the flight moves up the pile. The described action for the steeper slopes of the pile is such that by the time the flight reaches the peak of the pile, most of the material has been lost. For this reason, phosphate backstackers are limited to an angle of repose of the stack of 27 degrees, which is less than the natural angle of repose and also greater horsepower is required for the drive. Some greater retention of material in the flight can be had by making the flight cup-shaped in the direction of stacking travel; however the percentage gained is small. A disadvantage of such an arrangement is that the flight shape creates large forces on the flight-to-chain connection when the flight is carried around sprockets.

SUMMARY OF THE INVENTION

This invention overcomes many of the problems of prior art backstackers by providing hinged skirts or fencing means on either side of the flights to create a trough which contains the material during stacking. The skirts are supported by the boom structure and are held in place during the stacking operation by mechanical means, such as hydraulic cylinders, which are the means for retracting the skirts for a reclaiming operation. A cap plate is mounted in the boom structure and extends over each lower reach flight to prevent spillage over the top of the flight. The material is thus totally enclosed on top, on the sides, and on the bottom by the pile. The skirts and cap retain the material within the flights so that a stacking capacity may be had which is larger than the reclaiming capacity.

The skirts are also used for a reclaiming operation. During such operation, the boom travels laterally along the side of the pile and the leading skirt is retracted while the trailing skirt remains in place. This acts to confine the material within the flights, thus improving the reclaim efficiency by eliminating the material which otherwise would trail out as the flight fills to capacity.

BRIEF DESCRIPTION OF THE DRAWINGS

FIG. 1 is a side elevation of the invention showing a single four-link boom mounted on a rotatable frame; and FIG. 2 is a cross sectional view, the plane of the section being indicated by the line 2—2 in FIG. 1.

DETAILED DESCRIPTION OF THE INVENTION

Referring now to the drawings, there is illustrated an example of the present invention utilized in a single four-link boom mounted on a frame, which is, in turn, mounted for rotation through 360 degrees on a circular track (not shown). It will be appreciated, however, that the particular inventn may be utilized in other stacking and reclaiming devices. The frame structure is of conventional design and is not shown in detail in the drawings.

There is provided a supporting frame 10 which supports a four-link boom 12. The boom 12 is composed of a first link 14 suitably mounted in the support frame 10. A second link 16 is pivotably secured to the first link 14 on an axis 18 and provides an upper reach 20 for the boom structure. A third link 22 is pivotally secured on an axis 24 to the outer or distal extremity of the second link 16. A fourth link 26 is pivotally secured to third link 22 on an axis 28, and the geometric figure is closed by attachment of the fourth link 26 to the first link 14 on an axis 30. The first, second, third, and fourth links define an outer periphery 32 along which a plurality of flights 36 are secured to and spaced along parallel chains 34 and 35 (FIG. 2) to which the flights are attached. The chains 34 and 35 are trained around spaced drive sprockets 37 which are mounted on a drive shaft 39. Idler sprockets 40 are provided at the other intersections of the boom sections. As may be noted most clearly in FIG. 2, the chains are confined in and supported by box-shaped guideways 41.

To operate the drive sprockets 37, the chains 34 and 35 are driven in a counterclockwise direction, as viewed in FIG. 1.

In order to supply bulk material to the fourth link 26, there is provided a tripper 118 which includes a conveying belt 120 having a discharge extremity 122 adapted to cascade bulk material into a hopper 124. The hopper 124 communicates, in turn, with a loading chute 126, or a bypass chute 128. A suitable stop gate 130 controls the flow of material through the chutes 126 and 128. The chute 128 discharges bulk material onto a return conveyor belt 108, bypassing the entire stacking operation. The granular material falls through the flights of the upper reach 20 and onto a charging chute 104 located directly below the flights in the link 14. The flights 36 convey the material to the link 26 where the flights in that link convey the material upwardly along the face of a pile 70.

To aid in the backstacking operation and to create a trough for containing the material during the backstacking operation, a plurality of hinged side skirts or fencing means 132 and 133 are provided on the link 26. These skirts tend to laterally confine the material when the material is being pushed up the stack. To prevent material spillage from flight to flight, a cap plate 134 totally encloses the material.

To reclaim the material from the pile, the flights are driven in a clockwise direction so that the flight 36 traversing the link 26 will scrape particulate material from the pile 70. Material scraped from the pile will then be carried by the flights 36 in the link 14 to a discharge hopper 106 and then to a conveyor belt 108. It should be noted that the hopper 106 is blocked by a suitable valve during the backstacking operation. The valve is opened during the reclaiming operation.

During reclaiming, the boom is caused to traverse the face of the pile and, therefore, the lead skirt is retracted to load the flights while the following skirt 133 remains in its lowered position. The retraction of the skirt is accomplished by a hydraulic cylinder 140 pivoted at one end to the boom and having a rod 142 pivoted to the skirt. The skirt itself is also hinged to the boom. As the reclaiming operation progresses, and as the bulk material is worn down during reclamation, it is necessary to lower the four-link boom structure from the stacking position shown in solid lines in FIG. 1 to the ultimate reclining position shown in dotted lines in FIG. 1. One form of causing movement of the four-link boom in a vertical plane is shown in FIG. 1 and comprises a fifth link 143 pivotally secured at one end and provided with a roller 144 at its extremity adapted for coaction with a rail 145 mounted on the other side of the second link 16. The lower extremity of the elevating link 143 is pivotally mounted on the axis 30. A ball screw jack 150 of relatively long stroke is mounted by suitable brackets 152 and 154 along the underside of the second link. An extendable rod 156 extending from a cylinder 158 is joined to a bearing member 148. By movement of the rod 156, the roller bearing end of the link 143 may be reciprocated back and forth along the rail 145, thereby changing the distance between the link 16 and the axis 30 and effecting movement of the pivotally connected links in a vertical plane.

What is claimed is:

1. A backstacker-reclaimer apparatus comprising a frame, a combined stacking and reclaiming boom having proximal and distal extremities mounted on said frame, means for raising and lowering the distal extremity of the boom, a plurality of spaced stacking and reclaiming flights having end edges, endless means for supporting said flights longitudinally movable along the upper and lower reaches of said boom, including head and tail sprocket means for said endless flight supporting means located at the distal and proximal extremities of said boom, means for removing reclaimed bulk material, means for feeding bulk material to the lower reach of said boom to permit the flights of said lower reach to push said material onto a stack, fencing means extending from at least one side of the lower region of said boom in a direction substantially perpendicular to said flights and extending so as to substantially cover said end edges, said fencing means being retractable to expose the edges of the flights.

2. A backstacker-reclaimer apparatus according to claim 1, wherein the lower reach of said boom is provided with cap means extending over the flights from the proximal to the distal end of said boom.

3. A backstacker-reclaimer apparatus according to claim 1, wherein said fencing means extend on both sides of said boom.

4. A backstacker-reclaimer apparatus according to claim 3 wherein both said fencing means are retractable.

* * * * *